United States Patent [19]

Kirsch et al.

[11] 4,422,820
[45] Dec. 27, 1983

[54] SPOILER FOR FLUID TURBINE DIFFUSER

[75] Inventors: Jerome Kirsch, Dix Hills; Edward Markow, Oakdale, both of N.Y.

[73] Assignee: Grumman Aerospace Corporation, Bethpage, N.Y.

[21] Appl. No.: 427,622

[22] Filed: Sep. 29, 1982

[51] Int. Cl.[3] .............................................. F03D 7/04
[52] U.S. Cl. .................................. 415/4; 415/DIG. 1
[58] Field of Search ...................... 415/2 A, 3 A, 4 A

[56] References Cited

U.S. PATENT DOCUMENTS

| 407,500 | 2/1878 | Oman et al. | 415/2 A X |
|---|---|---|---|
| 1,112,251 | 9/1914 | Bicalky | 415/2 A X |
| 1,312,021 | 8/1919 | Dickinson et al. | 415/4 A X |
| 1,345,022 | 6/1920 | Oliver | 415/4 A X |
| 1,578,923 | 3/1926 | Schlotter | 415/148 |
| 2,017,961 | 10/1935 | Ferral | 415/2 A |
| 4,132,499 | 1/1979 | Igra | 415/2 A |
| 4,204,799 | 5/1980 | de Geuss | 415/2 A |
| 4,288,704 | 9/1981 | Bosard | 415/4 A X |
| 4,324,985 | 4/1982 | Oman | 415/4 A X |

FOREIGN PATENT DOCUMENTS

| 29783 | 6/1922 | Denmark | 415/4 A |
|---|---|---|---|
| 168108 | 3/1906 | Fed. Rep. of Germany | 415/4 A |
| 2930073 | 2/1981 | Fed. Rep. of Germany | 415/3 A |
| 2425002 | 1/1980 | France | 415/4 A |
| 2488337 | 2/1982 | France | 415/3 A |
| 249011 | 3/1926 | United Kingdom | 415/3 A |

Primary Examiner—Everette A. Powell, Jr.
Attorney, Agent, or Firm—John P. Kozma; Richard G. Geib; Daniel J. Tick

[57] ABSTRACT

A passive means for controlling the power augmentation of a diffuser augmented wind turbine is disclosed. Spoiler tabs for the boundary layer control slots of a diffuser augmented wind turbine include a lifting surface responsive to the fluid flow velocity through the slot and operate to block the slot when fluid flow velocity through the slot exceeds a predetermined level.

11 Claims, 6 Drawing Figures

SPOILER FOR FLUID TURBINE DIFFUSER

BACKGROUND OF THE INVENTION

The invention relates to fluid-energy conversion devices in general, and particularly to a passive means for controlling the power output of a diffuser augmented turbine.

U.S. Pat. Nos. 4,075,500, issued to Oman et al and assigned to the present assignee; 4,132,499, issued to Igra; and 4,204,799 issued to de Geus are illustrative of patents teaching the use of boundary layer control slots in a diffuser augmented wind turbine. In the devices disclosed in each of the aformentioned patents, a diffuser for a wind driven turbine takes the form of a duct which channels the air driving the turbine. By flaring the duct outlet (i.e., making the duct outlet greater in cross sectional area than the duct inlet), a desired exit plane pressure is effected behind the turbine blades. Thus, a greater mass flow rate of air is caused to flow through the turbine's blades, and power output is increased accordingly.

To prevent separation or stagnation of the air along the exit stream boundary layer (next to the duct's inner surface) with respect to the air in the center of the exit stream, one or more openings are provided in the periphery of the duct around and/or behind the turbine blades. These boundary layer control slots serve to inject high velocity air from the external air stream and allow a shorter duct to be used to control the diffusion of the turbine wake.

It has been observed that a simple cyindrical duct increases the power output of a wind machine by about 41%. Using a diffuser with boundary layer control slots can yield a power augmentation factor of at least 4.25 over a similar unshrouded turbine, and factors as high as 5.5 may be achieved.

One drawback of the power augmentation realized in such systems is that high wind speeds may drive the turbine and generator beyond rated operating levels. It is thus desirable to provide means for limiting the maximum power output of diffuser augmented machines.

One possible means for limiting the power output of a wind turbine is suggested in U.S. Pat. No. 3,944,840, issued to Troll. By using a windspeed sensor to control the cross sectional area of entrance and exit openings to the turbine, the Troll device achieves a constant generator speed.

However, relatively large surface fore and aft of the turbine must be displaced in order to directly control the flow impinging on the rotor.

Another approach is shown in French Pat. No. 559,239, issued to Moigne. In the Moigne system, a series of vents, similar to the boundary control slots of the Oman et al, Igra and de Geus diffusers, are provided with doors which are mechanically connected to the turbine itself.

Neither Troll nor Moigne suggest, however, a wind turbine control which operates without need of mechanical or electrical linkages.

SUMMARY OF THE PRESENT INVENTION

It is, therefore, a general object of this invention to provide a passive means for controlling the power output of a diffuser augmented wind turbine.

Another object of the present invention is to provide such power control means which is both economical and reliable.

In keeping with these objectives, the boundary layer control slots of a wind turbine diffuser are fitted according to the present invention with one or more tabs, each tab having an aerodynamically shaped lifting surface across which passes high velocity external air entering the slot. The tabs are preloaded or biased such that fluid flow through the slot of less than pre-determined velocities offers no impediment to normal slot operation. When fluid velocity increases toward pre-determined values, lift forces on the tab cause it to rise in a direction as to block the slot. Fluid trapped beneath the rising tab exerts direct pressure in the same direction. The tab then closes and is held in the closed position by this fluid pressure on the bottom of the tab. Thus stagnated fluid under the tab maintains the tab in the blocking position until normal operating wind speed is restored.

BRIEF DESCRIPTION OF DRAWINGS

Reference is made in the following descriptions to the appended drawing figures, in which.

DETAILED DESCRIPTION OF PREFERRED EMBODIMENTS

Figure 1:
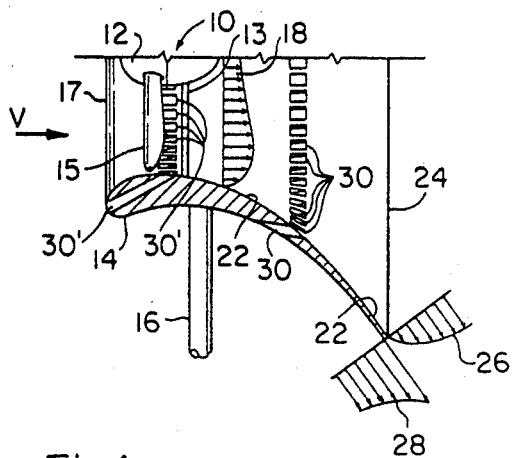
FIGS. 1 and 2 show schematic representations of the flow field for a diffuser augmented wind turbine having boundary layer control slots.

FIG. 1 shows air flow fields in a cutaway plane of a diffuser augmented wind machine 10. As shown, wind machine 10 includes a centerbody 12 mounted as by stators 13 in a diffuser shroud or duct 14. It will be appreciated that centerbody 12 serves to mount a rotatable turbine having blades 15, as well as housing a transducer device, such as a synchronous or induction generator. Typically, duct 14 is mounted on a rotatable pole 16 so that the duct inlet 17 may be directed toward the wind.

As indicated by flow field schematic 18, the air just behind turbine blades 15 is generally uniform in velocity, although some separation or loss of momentum begins to occur along boundary layer 22. As would be expected since the duct outlet 24 is greater in cross sectional area than inlet 17, this separation is more pronounced as the air exits duct 14. Flow field schematic 26 shows the relatively slower air exiting outlet 24, while higher velocity external air is indicated at 28.

To minimize the stagnation of air along boundary layer 22, boundary layer controls slots 30 are provided between turbine blades 15 and duct outlet 24 while slots 30' inject air in the region directly surrounding the blades. As shown, slots 30 and 30' are rectangular in shape, but it should be understood that other configurations will also be compatible with the present invention. For instance, one or more continuous slots around the entire periphery of the duct may be provided by employing a multi-section duct, with gaps between the different sections defining the slots. The essential feature of boundary layer control slots 30 is that they allow high energy external air to be conducted to boundary layer 22.

Figure 2:
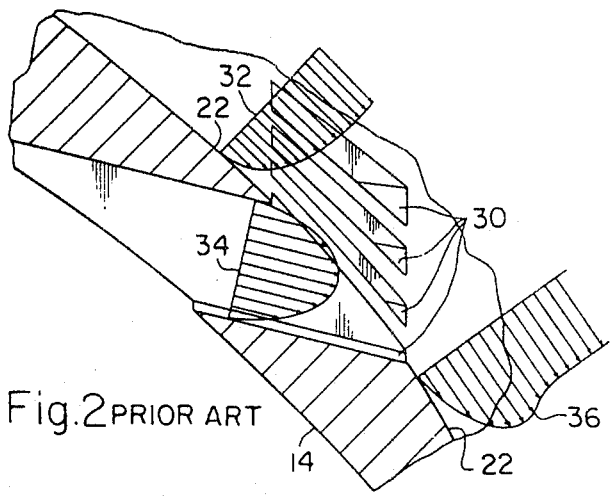

The flow fields along boundary layer 22 in the region of slots 30 are illustrated in FIG. 2. As indicated by schematic 32, air velocity along boundary layer 22 is relatively diminished on approaching slots 30. High velocity external air is injected through slots 30, as at 34, resulting in re-energizing of boundary layer air as indicated by flow field 36.

As noted in the background section, such re-energizing of boundary layer air can improve the power output of the wind turbine by a factor of 4.25–5.5. It will thus be appreciated that power output will be much more sensitive to changes in wind speed (ambient or external fluid velocity) such as gusts. Since it is impractical to design the turbine and generator for safe and efficient operation over a wide range of output power, it becomes necessary to provide the diffuser augmented wind machine with power limiting means.

Figure 3:
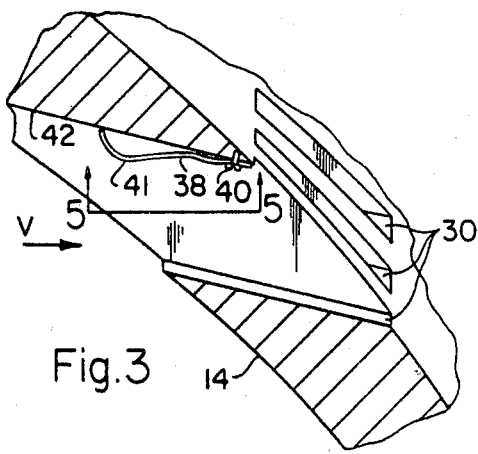
FIG. 3 shows a cross section view of a boundary layer control slot with a spoiler tab in its preload position.
Figure 4:
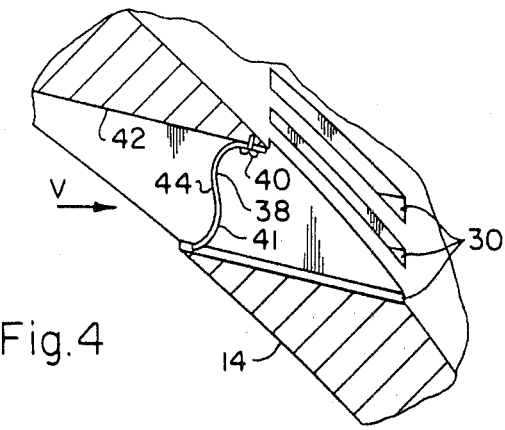
FIG. 4 is a view similar to FIG. 3 but showing the tab in its attenuating position.

Referring to FIG. 3, a spoiler tab 38 is attached, as by screw 40, to a mounting point on duct 14. In its preloaded (no wind) position shown in FIG. 3, tab 38 extends generally toward the duct inlet along inner surface 42 of slot 30 and presents little or no impediment to fluid flow through the slot. A decrease in pressure against an aerodynamic lifting surface 41 of tab 38 is occasioned by fluid flow through slot 30. It will be appreciated that tab 38 may be formed from a flexible material such as spring steel to have a stiffness corresponding to a pre-determined limit of fluid flow velocity through slot 30 across surface 41. Thus when the velocity of the ambient fluid current, (e.g. windspeed), exceeds a desired maximum or normal limiting value, tab 38 will be forced away from surface 42 into an attenuating position (FIG. 4) to at least partially block slot 30, thus limiting the power augmentation due to boundary layer re-energization.

Once tab 38 is forced into its attenuating position, of course, fluid flow across lifting surface 41 of the tab will cease. Due to the orientation of the tab, however, direct fluid pressure will be exerted on the back surface 44 opposite lifting surface 41 by fluid trapped under the tab. Thus the tab is held in its closed or attenuating position until the ambient current subsides and pressure of the trapped fluid decreases to less than the tab preload tension.

Figure 5:
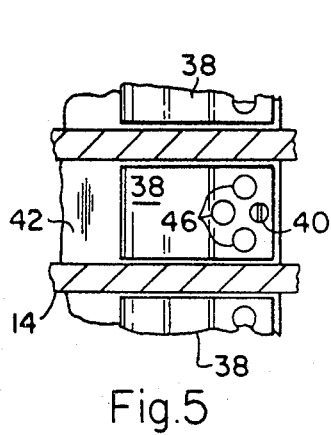
FIG. 5 is a view of the spoiler tab of FIG. 3 taken along lines 5—5.

In practice, if the preload tension or tab stiffness is correctly fixed, tab 38 will close when the windspeed or ambient fluid velocity increases to the normal limiting level, but once closed tab 38 will not reopen until the windspeed falls to another level somewhat lower than the normal limiting level. Some such hysteresis may be desirable, otherwise the tab may flutter at ambient windspeeds close to the desired operating level. FIG. 5 illustrates a means for controlling the hysteresis by providing one or more holes 46 through tab 38 near its mounting point for releasing trapped fluid pressure. Since holes 46 may affect the tab stiffness and, to a lesser extent, the tab's attenuating properties, some experimentation may be necessary to determine an optimum number, size and shape of the holes.

Figure 6:
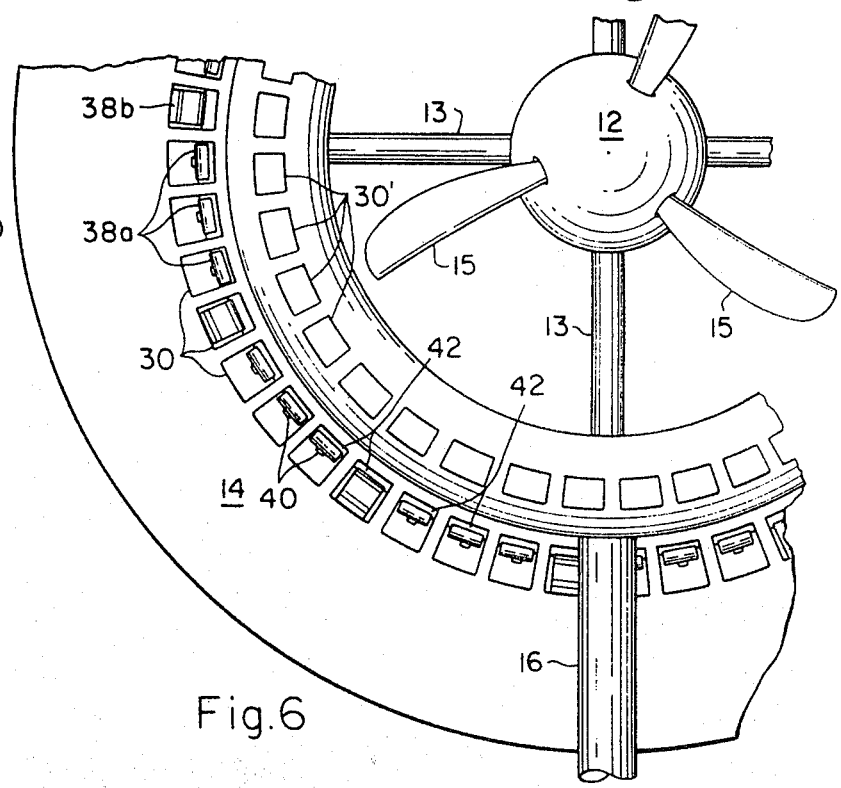
FIG. 6 is a front view of a machine having a plurality of slots and tabs.

Referring to FIG. 6, a partial front view of wind machine 10 having a plurality of boundary layer control slots 30 and 30' is shown. Also shown are spoiler tabs 38a and 38b associated with slots 30. Although not shown, slots 30' may also be provided with similar tabs.

To illustrate an embodiment of the present invention in which the power output of the wind machine may be maintained at a constant level for wind speeds in excess of the desired operating level, only tabs 38b are shown in their attenuating position, while tabs 38a remain in the open or preload position. As described above, each tab is formed from a flexible material with a stiffness corresponding to a predetermined limit of fluid flow velocity through the slot for that particular tab. Each tab is assigned a different limiting velocity, however, so that not all of the tabs will close immediately upon the ambient windspeed exceeding the desired operating level. Rather, the tabs will close in a desired sequence to maintain power output at or near the desired operating level.

FIG. 6, then, represents a situation in which the ambient fluid current is somewhat above the velocity necessary for maximum rated poer output. Some of the boundary layer control slots 30 are blocked by tabs 38b, to decrease the power augmentation in accordance with the turbine/generator rating. If the ambient wind speed were to increase, some or all of the remaining tabs 38a would close in sequence, whereas a decrease in wind speed would cause some or all of tabs 38b to return to their preload position.

Those skilled in the art will no doubt appreciate that various modifications of the preferred embodiments described above may be made without departing from the spirit of the present invention. For instance, the tabs may be formed from a rigid material, hinged to the duct, and maintained in preload position by means of discrete bias springs. It may also be desirable to use discrete bias springs with varying spring rates to realize the sequential tab operation described with reference to FIG. 6 without varying the stiffnesses of the tabs themselves.

Since these and other variations will suggest themselves to those skilled in the art, the foregoing descriptions are presented by way of example only, the scope of the present invention being limited only by the claims which follow.

What is claimed is:

1. A fluid-energy device having a passively limited power output, said device comprising:
   a duct with an inlet, an outlet of greater cross sectional area than the inlet, and at least one slot for conducting external fluid to a boundary layer along an inner surface of the duct between the inlet and the outlet;
   a rotatable turbine mounted within the duct between the outlet and the inlet; and
   at least one tab mounted to the duct so as to have a preload position in which fluid flow through the slot is relatively unimpeded and an attenuating position in which the slot is at least partially blocked, said tab having a lifting surface arranged such that fluid flow through the slot causes a decrease in pressure against the lifting surface.

2. The device of claim 1 which further comprises a mechanical-to-electrical transducer loading the turbine.

3. The device of claim 1 in which the duct is rotatable such that the inlet may be directed toward an ambient fluid current.

4. The device of claim 1 in which the lifting surface of the tab extends generally toward the inlet from a mounting point of the tab along an inner surface of the slot when the tab is in the preload position, said lifting surface being forced away from the slot's inner surface by the decrease in pressure caused by fluid flow through the slot such that the tab assumes its attenuating position.

5. The device of claim 4 in whch the tab is formed from a flexible material to have a stiffness corresponding to a predetermined limit of fluid flow velocity through the slot such that the tab is forced into the attenuating position when the velocity of the ambient fluid current exceeds a desired operating level.

6. A fluid-energy device having a passively limited power output, said device comprising:
   a duct with an inlet, and outlet of greater cross sectional area than the inlet, and at least one slot for conducting external fluid to a boundary layer along an inner surface of the duct between the inlet and the outlet;
   a rotatable turbine mounted within the duct between the outlet and the inlet; and
   at least one tab mounted to the duct so as to have a preload position in which fluid flow through the slot is relatively unimpeded and an attenuating position in which the slot is at least partially blocked, said tab having a lifting surface arranged such that fluid flow through the slot causes a decrease in pressure against the lifting surface, the tab further including at least one hole near its mounting point for releasing trapped fluid pressure.

7. In a diffuser augmented wind turbine having at least one boundary layer control slot, the improvement which comprises at least one tab mounted within the boundary layer control slot such that fluid flow through the slot is substantially parallel to a lifting surface of the tab, whereby the tab is forced into a position to block the boundary layer control slot when the velocity of the fluid flow therethrough exceeds a desired limit.

8. A fluid-energy device having a passively limited power output, said device comprising:
   a duct with an inlet, an outlet of greater cross sectional area than the inlet, and at least one slot for conducting external fluid to a boundary layer along an inner surface of the duct between the inlet and the outlet;
   a rotatable turbine mounted within the duct between the outlet and the inlet; and
   a plurality of tabs mounted to the duct such that each tab has a preload position in which fluid flow through the slot is relatively unimpeded by the tab and an attenuating position in which the slot is at least partially blocked by the tab, each of said tabs having a lifting surface arranged such that fluid flow through the slot causes a decrease in pressure against the lifting surface.

9. The device of claim 8 in which each tab is formed from a flexible material to have a stiffness corresponding to a predetermined limit of fluid flow velocity through the slot for that particular tab, such that each tab is forced into its attenuating position when the fluid flow velocity through the slot exceeds the predetermined limit for that tab.

10. The device of claim 9 in which the stiffness of each tab is chosen so that as the velocity of an ambient fluid current increases beyond a desired operating level, the tabs will be forced into their attenuating positions in a desired sequence to maintain a power output of the device at a constant level.

11. The device of claim 10 in which at least one of the tabs includes at least one hole near a mounting point of said tab for releasing trapped pressure.

* * * * *

UNITED STATES PATENT AND TRADEMARK OFFICE
CERTIFICATE OF CORRECTION

PATENT NO. : 4,422,820
DATED : Dec. 27, 1983
INVENTOR(S) : Jerome Kirsch et al

It is certified that error appears in the above-identified patent and that said Letters Patent are hereby corrected as shown below:

Cover page, Reference Cited, the first reference "407,500 2/1878" should read -- 4,075,500 2/1978--

Col. 1, line 15, "aformentioned" should read -- aforementioned --

Col. 4, line 18, "poer" should read -- power --

Col. 5, line 3, "whch" should read -- which --.

Signed and Sealed this

Eighteenth Day of December 1984

[SEAL]

Attest:

GERALD J. MOSSINGHOFF

Attesting Officer

Commissioner of Patents and Trademarks